United States Patent
Yu et al.

(10) Patent No.: US 11,198,341 B2
(45) Date of Patent: Dec. 14, 2021

(54) TRAILER DETECTION AND AUTONOMOUS HITCHING

(71) Applicant: Continental Automotive Systems, Inc., Auburn Hills, MI (US)

(72) Inventors: Xin Yu, Troy, MI (US); Matthew Donald Berkemeier, Beverly Hills, MI (US); Julien Ip, Madison Heights, MI (US); Eduardo Jose Ramirez Llanos, Auburn Hills, MI (US); Kyle P Carpenter, Rochester, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 273 days.

(21) Appl. No.: 16/400,700

(22) Filed: May 1, 2019

(65) Prior Publication Data
US 2019/0337344 A1 Nov. 7, 2019

Related U.S. Application Data

(60) Provisional application No. 62/665,247, filed on May 1, 2018.

(51) Int. Cl.

| | |
|---|---|
| *B60D 1/36* | (2006.01) |
| *G06T 7/70* | (2017.01) |
| *B62D 13/06* | (2006.01) |
| *G06T 7/73* | (2017.01) |
| *B62D 15/02* | (2006.01) |

(Continued)

(52) U.S. Cl.
CPC .............. *B60D 1/36* (2013.01); *B62D 13/06* (2013.01); *B62D 15/026* (2013.01); (Continued)

(58) Field of Classification Search
CPC .... B60D 1/39; G06T 7/70; G06T 7/74; G06T 2207/30244; G06T 2207/30252;
(Continued)

(56) References Cited

U.S. PATENT DOCUMENTS

2002/0154005 A1* 10/2002 Wall .................. B60D 1/36
340/431
2005/0074143 A1* 4/2005 Kawai ................ B62D 13/06
382/104
(Continued)

FOREIGN PATENT DOCUMENTS

| CN | 106225723 A | 12/2016 |
|---|---|---|
| DE | 102012018914 A1 | 3/2014 |
| EP | 3299191 A1 | 3/2018 |

OTHER PUBLICATIONS

International Search Report and the Written Opinion of the International Searching Authority for the corresponding PCT Application No. PCT/US2019/030236.

*Primary Examiner* — Peter D Nolan
*Assistant Examiner* — Wae L Louie

(57) ABSTRACT

A method for autonomously maneuvering a tow vehicle. The method includes receiving images from one or more cameras positioned on a back portion of the tow vehicle and receiving sensor data from an inertial measurement unit supported by the tow vehicle. The method also includes determining a pixel-wise intensity difference between a current received image and a previous received image. The method includes determining a camera pose and a trailer pose with respect to a world coordinate system. The camera pose and the trailer pose are based on the images, the sensor data, and the pixel-wise intensity difference. The method includes determining a tow vehicle path based on the camera pose and the trailer pose. The method also includes instructing a drive system supported by the tow vehicle to autonomously maneuver along the tow vehicle path in a reverse direction causing the tow vehicle to hitch with the trailer.

14 Claims, 8 Drawing Sheets

(51) Int. Cl.
   G05D 1/02   (2020.01)
   G06T 11/20  (2006.01)
   H04N 5/225  (2006.01)
   *G05D 1/00*    (2006.01)

(52) U.S. Cl.
   CPC ......... G05D 1/0225 (2013.01); G05D 1/0246 (2013.01); G06T 7/70 (2017.01); G06T 7/74 (2017.01); G06T 11/20 (2013.01); H04N 5/2253 (2013.01); *G05D 1/0016* (2013.01); *G06T 2207/30244* (2013.01); *G06T 2207/30252* (2013.01); *G06T 2210/12* (2013.01)

(58) Field of Classification Search
   CPC .............. G06T 2210/12; B62D 15/026; G05D 1/0225; G05D 1/0016
   See application file for complete search history.

(56) References Cited

U.S. PATENT DOCUMENTS

| | | | |
|---|---|---|---|
| 2014/0151979 A1* | 6/2014 | Puckett | B60D 1/015 280/477 |
| 2015/0077557 A1* | 3/2015 | Han | B60D 1/36 348/148 |
| 2015/0321666 A1* | 11/2015 | Talty | G05D 1/0259 701/41 |
| 2017/0129403 A1* | 5/2017 | Lavoie | B62D 15/027 |
| 2017/0151846 A1* | 6/2017 | Wuergler | B60D 1/62 |
| 2017/0217372 A1* | 8/2017 | Lu | H04N 5/23293 |
| 2017/0341583 A1* | 11/2017 | Zhang | B60R 1/00 |
| 2018/0056868 A1* | 3/2018 | Naserian | B60R 1/003 |
| 2018/0147900 A1* | 5/2018 | Shank | B60R 25/25 |
| 2019/0047346 A1* | 2/2019 | Carpenter | B60G 17/0155 |
| 2019/0064831 A1* | 2/2019 | Gali | B60W 10/18 |
| 2019/0092109 A1* | 3/2019 | Carpenter | G05D 1/0223 |
| 2019/0094872 A1* | 3/2019 | Li | G05D 1/0225 |
| 2019/0308473 A1* | 10/2019 | Yu | B60D 1/62 |
| 2019/0335100 A1* | 10/2019 | Chen | G06K 9/4609 |
| 2019/0337343 A1* | 11/2019 | Ramirez Llanos | G06T 7/70 |
| 2019/0339704 A1* | 11/2019 | Yu | G06T 7/66 |
| 2019/0339708 A1* | 11/2019 | Ramirez Llanos | G06T 7/74 |
| 2019/0340787 A1* | 11/2019 | Ramirez Llanos | G06T 7/75 |
| 2019/0346858 A1* | 11/2019 | Berkemeier | B60D 1/36 |
| 2020/0039517 A1* | 2/2020 | Berkemeier | B60D 1/06 |

* cited by examiner

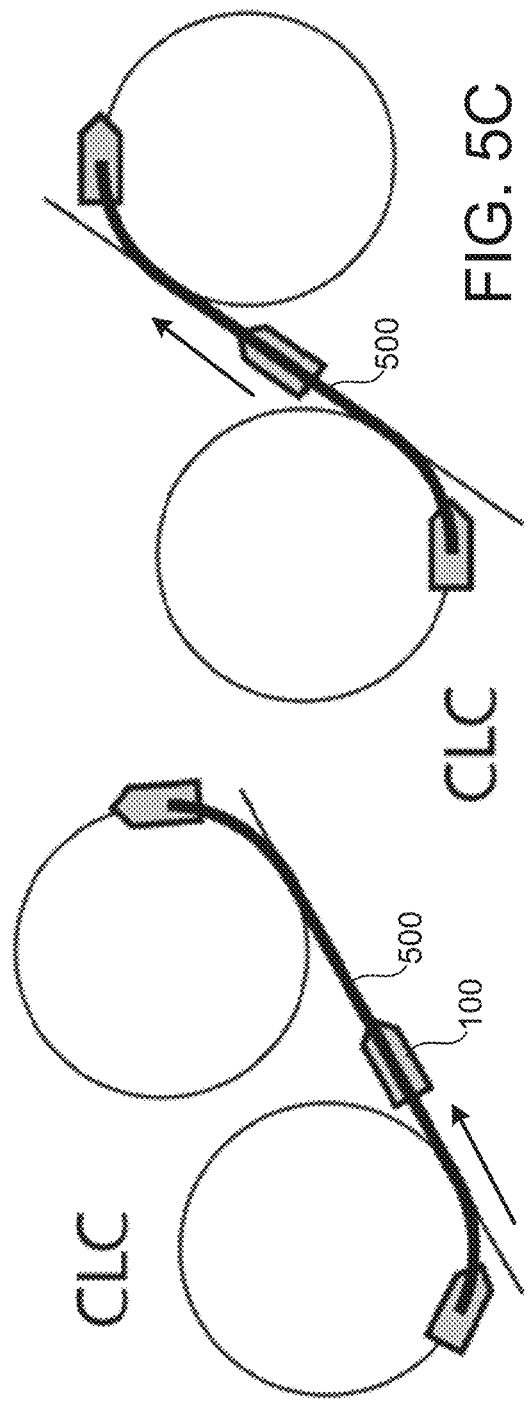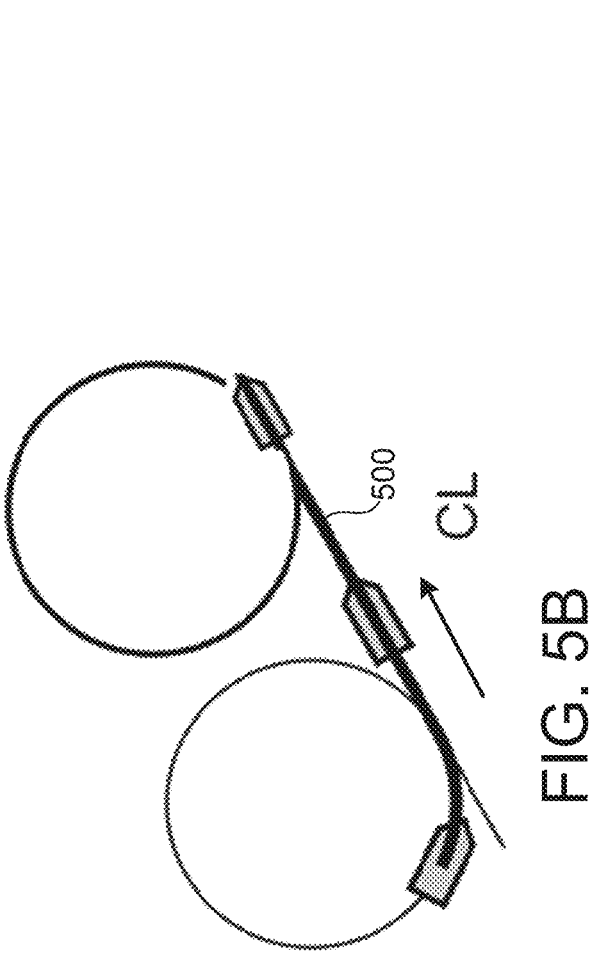

TRAILER DETECTION AND AUTONOMOUS HITCHING

CROSS REFERENCE TO RELATED APPLICATIONS

This U.S. patent application claims priority under 35 U.S.C. § 119(e) to U.S. Provisional Application 62/665,247, filed on May 1, 2018, which is hereby incorporated by reference in its entirety.

TECHNICAL FIELD

This disclosure relates to a method and device for detecting a trailer positioned behind a vehicle and autonomously maneuvering the vehicle towards the trailer.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used. In addition to the mechanical connection between the trailer and the powered vehicle, in some examples, the trailer is electrically connected to the tow vehicle. As such, the electrical connection allows the trailer to take the feed from the powered vehicle's rear light circuit, allowing the trailer to have taillights, turn signals, and brake lights that are in sync with the lights of the powered vehicle.

Recent advancements in sensor technology have led to improved safety systems for vehicles. As such, it is desirable to provide a system that is capable of determining a position of a trailer relative to a tow vehicle, which allows the tow vehicle to autonomously maneuver towards the trailer and autonomously hitch with the trailer.

SUMMARY

One aspect of the disclosure provides a method for autonomously maneuvering a tow vehicle towards a trailer for autonomous hitching between the trailer and the tow vehicle. The method includes receiving, at data processing hardware, images from one or more cameras positioned on a back portion of the tow vehicle and in communication with the data processing hardware. The method also includes receiving, at the data processing hardware, sensor data from an inertial measurement unit in communication with the data processing hardware and supported by the tow vehicle. The method also includes determining, at the data processing hardware, a pixel-wise intensity difference between a current received image and a previous received image. The method includes determining, at the data processing hardware, a camera pose and a trailer pose with respect to a world coordinate system. The camera pose and the trailer pose are based on the images, the sensor data, and the pixel-wise intensity difference. The method also includes determining, at the data processing hardware, a tow vehicle path based on the camera pose and the trailer pose. The method also includes sending instruction from the data processing hardware to a drive system supported by the tow vehicle. The instructions causing the tow vehicle to autonomously maneuver along the tow vehicle path in a reverse direction so that the tow vehicle hitches with the trailer.

Implementations of the disclosure may include one or more of the following optional features. In some implementations, the one or more cameras include a fisheye lens that includes an ultra wide-angle lens. The camera pose may include a camera location and a camera angle in the world coordinate system. The trailer pose may include a trailer location and a trailer angle in the world coordinate system.

In some examples, the method further includes identifying one or more feature points within the images. The feature points are associated with the trailer. The method may also include determining a plane based on the one or more feature points. The plane is indicative of a front face of the trailer. The method may also include determining a normal line to the plane. In some examples, the method also includes determining the trailer angle based on the normal line.

In some implementations, the method may include determining a region of interest surrounding a representation of the trailer within the images. Determining a pixel-wise intensity difference between the current received image and a previous received image, includes determining the pixel-wise intensity difference between the region of interest of the current received image and the region of interest of the previous received image. The method may further include identifying one or more feature points within the region of interest. The feature points are associated with the trailer. The method may also include tracking the one or more feature points as the vehicle autonomously maneuvers along the path.

In some examples, the method further includes determining a sequence of points associated with the path. The tow vehicle follows the sequence of points. The method may also include determining a steering wheel angle associated with each point within the sequence of points. The method may also include sending instructions to the drive system to adjust a current steering wheel angle based on the determined steering wheel angle. In some examples, the method further includes determining a difference between a steering angle of each front wheel of the tow vehicle, as the vehicle autonomously maneuver along the path. The method may also include sending instructions to the drive system to adjust the steering wheel angle of each wheel based on the difference between the steering wheel angle of each front wheel.

Another aspect of the disclosure provides a system for autonomously maneuvering a tow vehicle towards a trailer for autonomous hitching between the trailer and the tow vehicle. The system includes: data processing hardware; and memory hardware in communication with the data processing hardware. The memory hardware stores instructions that when executed on the data processing hardware cause the data processing hardware to perform operations that include the method described above.

The details of one or more implementations of the disclosure are set forth in the accompanying drawings and the description below. Other aspects, features, and advantages will be apparent from the description and drawings, and from the claims.

DESCRIPTION OF THE DRAWINGS

FIG. 4 is a schematic view of an exemplary path planning system shown in

FIG. 2.

FIGS. 5A-5C are schematic views of exemplary paths generated by a Dubins path generation module shown in FIG. 4.

Like reference symbols in the various drawings indicate like elements.

DETAILED DESCRIPTION

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch. It is desirable to have a tow vehicle that is capable of autonomously backing up towards a trailer identified from one or more trailer representations of trailers displayed on a user interface, such as a user display. In addition, it is also desirable to have a tow vehicle that is capable of estimating a trailer position, for example, a trailer angle and position relative to a tow vehicle, based on one or more images received from a camera positioned on a rear portion of the tow vehicle. The trailer angle and position with respect to the tow vehicle may be determined, for example, by fusing visual information from received images and IMU (inertial measurement unit) sensor data. In addition, it is desirable to have a tow vehicle that is capable of autonomously maneuvering along a planned path towards the trailer and to align with a trailer hitch coupler of the trailer for autonomous hitching between a vehicle hitch ball of the tow vehicle and the trailer hitch coupler.

Figure 1A:
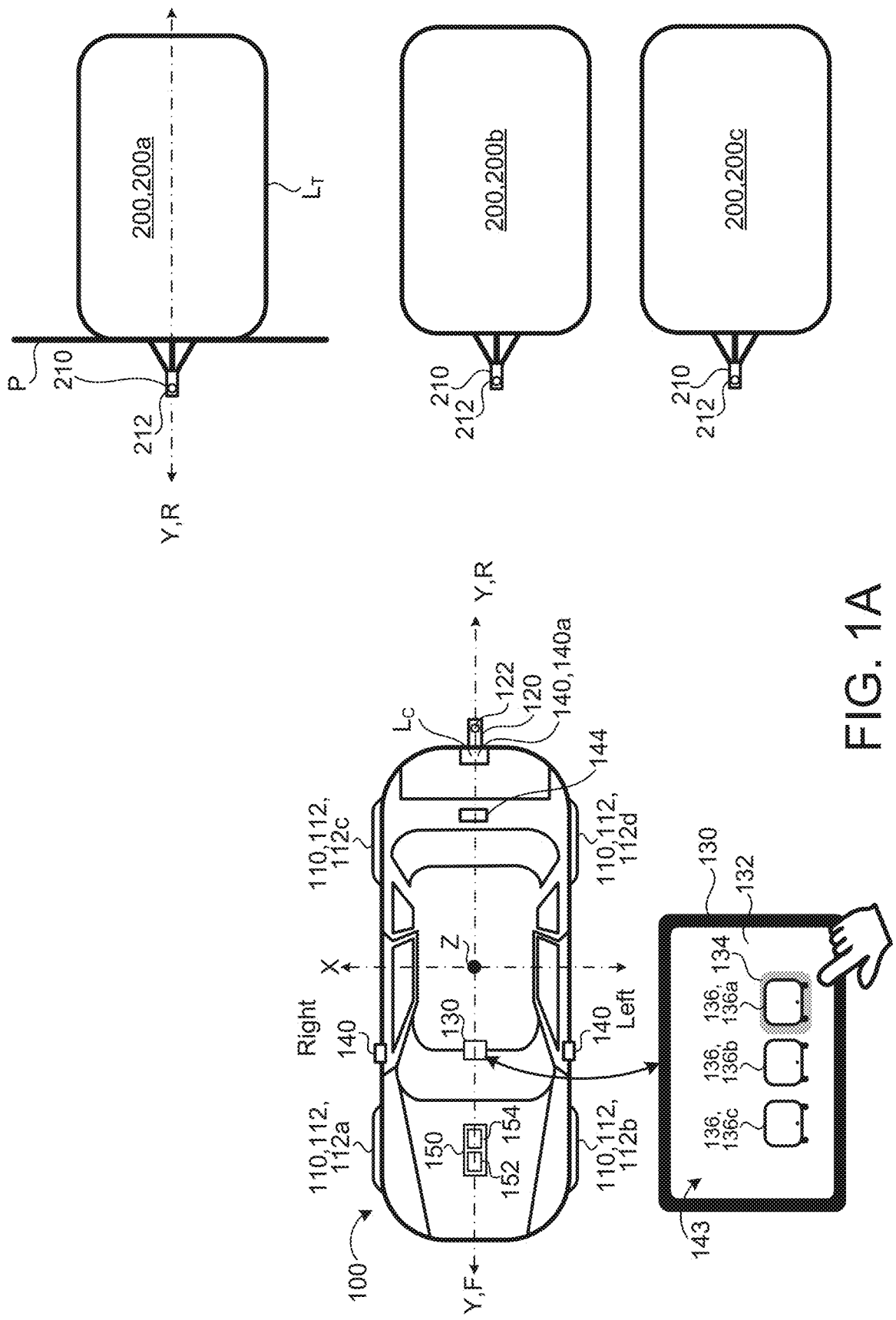
FIG. 1A is a schematic top view of an exemplary tow vehicle at a distance from trailers positioned behind the tow vehicle.
Figure 1B:
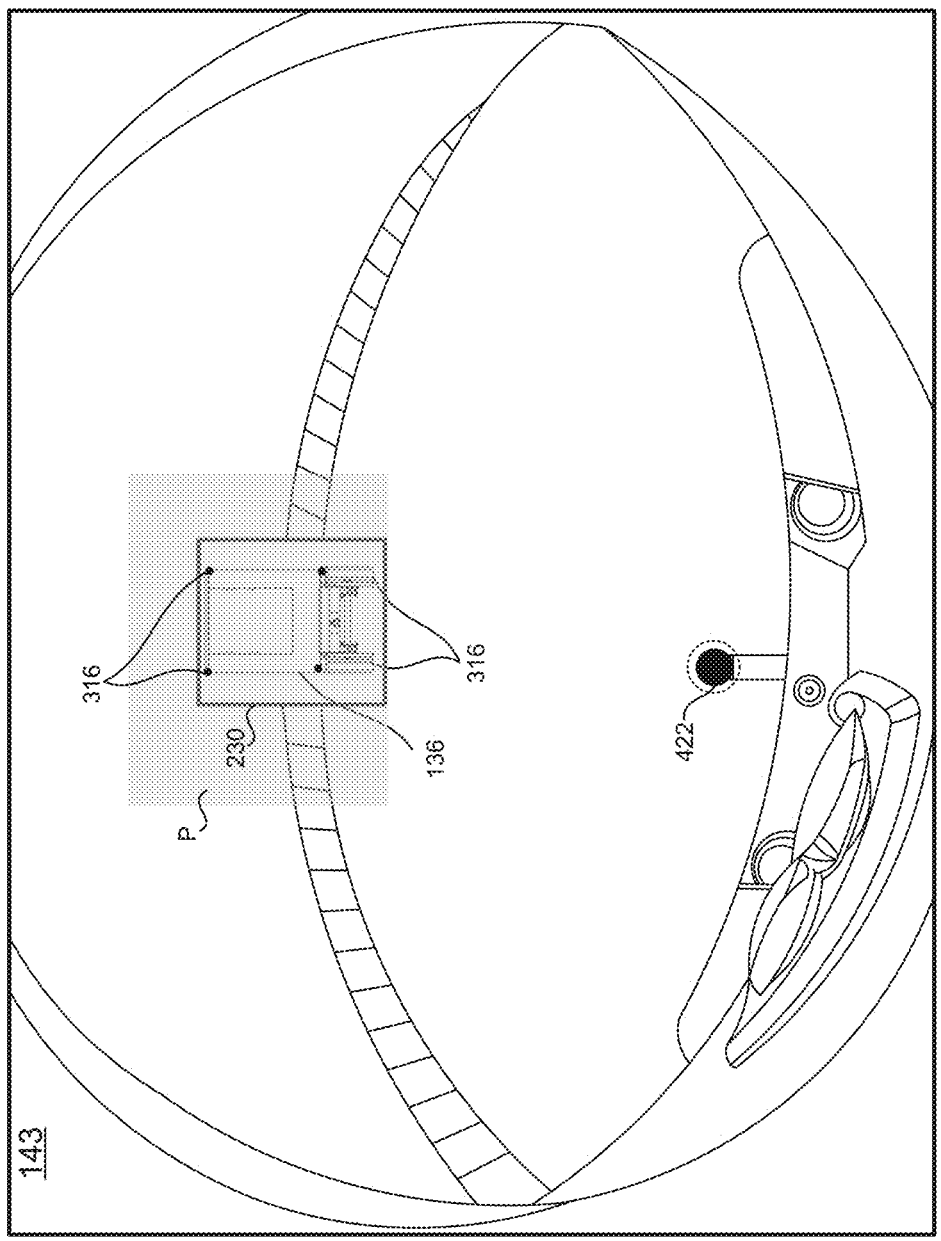
FIG. 1B is a schematic view of an exemplary image captured by a camera positioned on a rear portion of a vehicle, where the image captures a trailer positioned behind the vehicle.
Figure 1C:
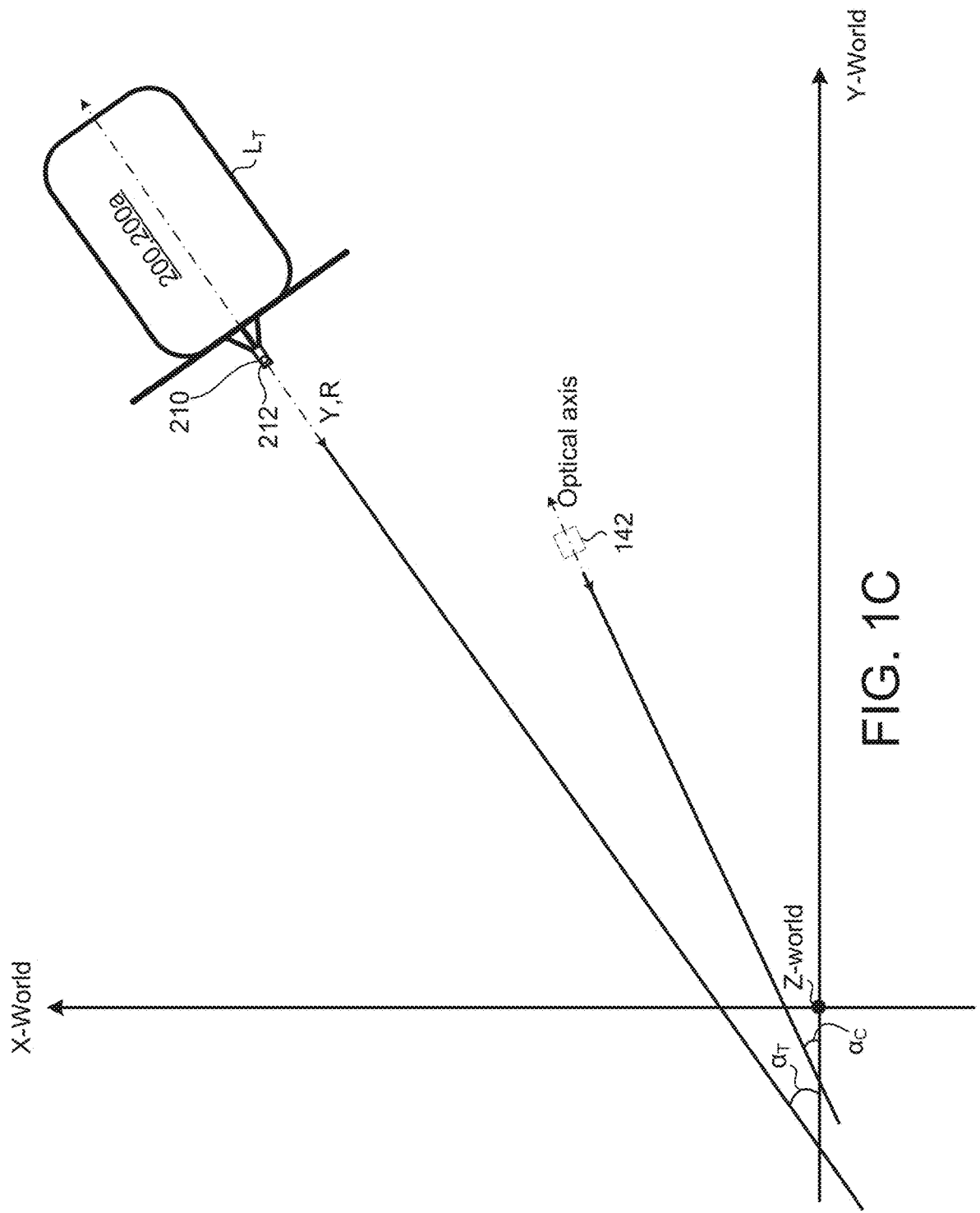
FIG. 1C is a schematic view of an exemplary trailer pose and an exemplary camera pose with respect to the world coordinate.
Figure 2:
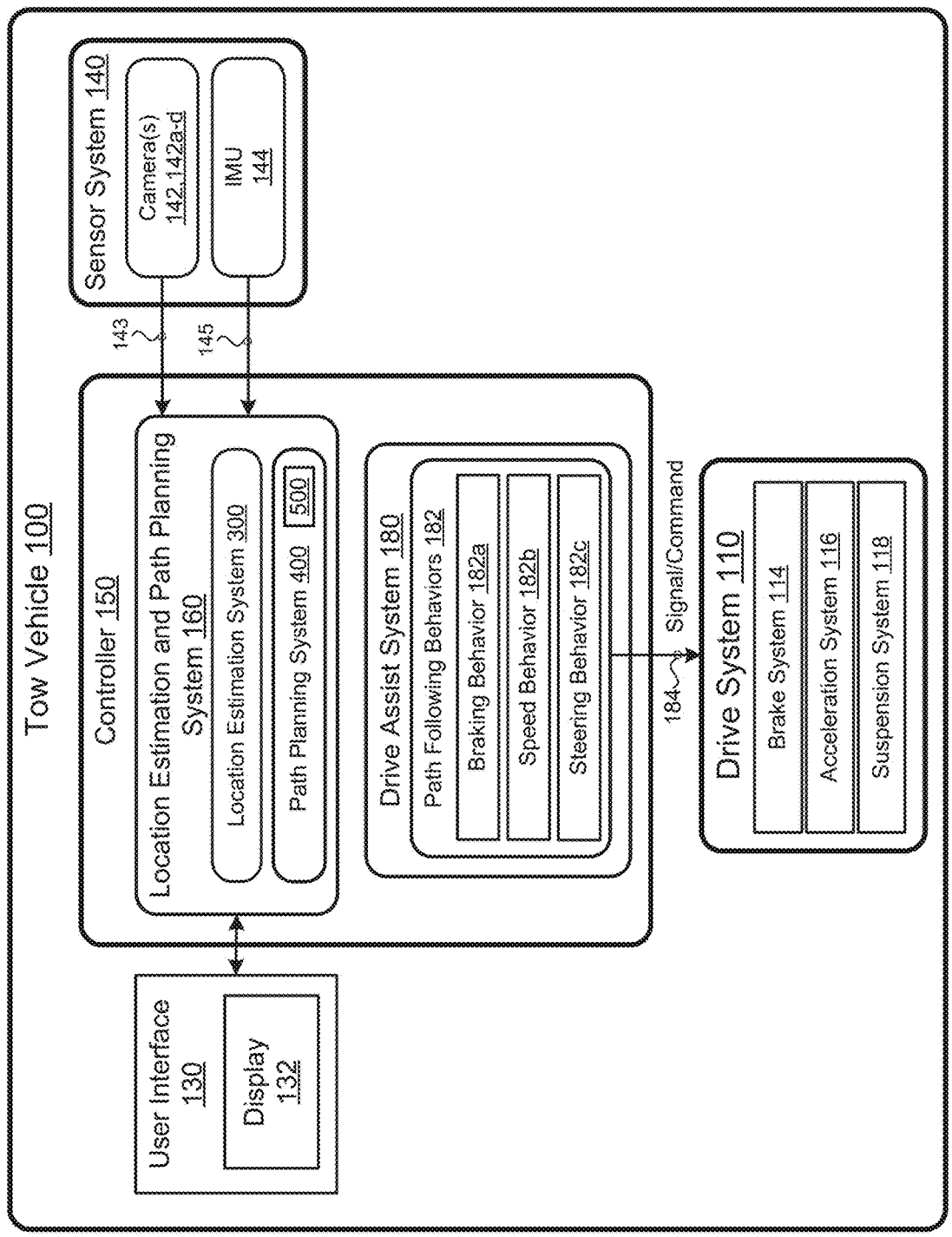
FIG. 2 is a schematic view of an exemplary tow vehicle having a user interface and a sensor system.

Referring to FIGS. 1A-2, in some implementations, a driver of a tow vehicle 100 wants to tow a trailer 200 positioned behind the tow vehicle 100. The tow vehicle 100 may be configured to receive an indication of a trailer selection 134 by the driver associated with a selected trailer 200, 200a-c. In some examples, the driver maneuvers the tow vehicle 100 towards the selected trailer 200, 200a-c, while in other examples, the tow vehicle 100 autonomously drives towards the selected trailer 200, 200a-c. The tow vehicle 100 may include a drive system 110 that maneuvers the tow vehicle 100 across a road surface based on drive commands having x, y, and z components, for example. As shown, the drive system 110 includes a front right wheel 112, 112a, a front left wheel 112, 112b, a rear right wheel 112, 112c, and a rear left wheel 112, 112d. The drive system 110 may include other wheel configurations as well. The drive system 110 may also include a brake system 114 that includes brakes associated with each wheel 112, 112a-d, and an acceleration system 116 that is configured to adjust a speed and direction of the tow vehicle 100. In addition, the drive system 110 may include a suspension system 118 that includes tires associates with each wheel 112, 112a-d, tire air, springs, shock absorbers, and linkages that connect the tow vehicle 100 to its wheels 112, 112a-d and allows relative motion between the tow vehicle 100 and the wheels 112, 112a-d. The suspension system 118 may be configured to adjust a height of the tow vehicle 100 allowing a tow vehicle hitch 120 (e.g., a vehicle hitch ball 122) to align with a trailer hitch 210 (e.g., trailer hitch coupler or trailer hitch cup 212), which allows for autonomous connection between the tow vehicle 100 and the trailer 200.

The tow vehicle 100 may move across the road surface by various combinations of movements relative to three mutually perpendicular axes defined by the tow vehicle 100: a transverse axis X, a fore-aft axis Y, and a central vertical axis Z. The transverse axis x, extends between a right side and a left side of the tow vehicle 100. A forward drive direction along the fore-aft axis Y is designated as F, also referred to as a forward motion. In addition, an aft or rearward drive direction along the fore-aft direction Y is designated as R, also referred to as rearward motion. When the suspension system 118 adjusts the suspension of the tow vehicle 100, the tow vehicle 100 may tilt about the X axis and or Y axis, or move along the central vertical axis Z.

The tow vehicle 100 may include a user interface 130. In some examples, the user interface 130 is a touch screen display 132 the allows the driver to make selections via the display. In other examples, the user interface 130 is not a touchscreen and the driver may use an input device, such as, but not limited to, a rotary knob or a mouse to make a selection. The user interface 130 receives one or more user commands from the driver via one or more input mechanisms or a touch screen display 132 and/or displays one or more notifications to the driver. The user interface 130 is in communication with a vehicle controller 150, which is in turn in communication with a sensor system 140. In some examples, the user interface 130 displays an image 143 of an environment of the tow vehicle 100 leading to one or more commands being received by the user interface 130 (from the driver) that initiate execution of one or more behaviors. In some examples, the user display 132 displays one or more trailer representations 136, 136a-c of trailers 200 positioned behind the tow vehicle 100. In this case, the driver makes a trailer selection 134 of a trailer representation 136, 136a-c of a trailer 200. The controller 150 may then determine a location LT of the trailer 200 associated with the trailer selection 134 relative to the tow vehicle 100. In other examples, the controller 150 detects one or more trailers 200 and determines the position LT of each one of the trailers associated with each one of the trailer representations 136, 136a-c relative to the tow vehicle 100. The vehicle controller 150 includes a computing device (processor) 152 (e.g., central processing unit having one or more computing processors) in communication with non-transitory memory 154 (e.g., a hard disk, flash memory, random-access memory, memory hardware) capable of storing instructions executable on the computing processor(s) 152.

The vehicle controller 150 executes a drive assist system 180, which in turn includes path following behaviors 182. The drive assist system 180 receives a planned path 500 from a path planning system 400 and executes behaviors 182a-182c that send commands 184 to the drive system 110, leading to the tow vehicle 100 autonomously driving about the planned path 500 in a rearward direction R and autonomously hitching with the trailer 200.

The path following behaviors 182 include, a braking behavior 182a, a speed behavior 182b, and a steering behavior 182c. In some examples, the path following behaviors 182 also include a hitch connect behavior (allowing the vehicle hitch ball 122 to connect to the trailer hitch cup 212), and a suspension adjustment behavior (causing the vehicle suspension to adjust to allow for the hitching of the vehicle hitch ball 122 and the trailer hitch coupler 212). Each behavior 182a-182c causes the tow vehicle 100 to take an action, such as driving backward, turning at a specific angle, breaking, speeding, slowing down, among others. The vehicle controller 150 may maneuver the tow vehicle 100 in any direction across the road surface by controlling the drive system 110, more specifically by issuing commands 184 to the drive system 110.

The tow vehicle 100 may include a sensor system 140 to provide reliable and robust driving. The sensor system 140 may include different types of sensors that may be used separately or with one another to create a perception of the environment of the tow vehicle 100 that is used for the tow vehicle 100 to drive and aid the driver in make intelligent decisions based on objects and obstacles detected by the sensor system 140. The sensor system 140 may include the one or more cameras 142, 142a-d. In some implementations, the tow vehicle 100 includes a rear camera 142, 142a that is mounted to provide a view of a rear-driving path of the tow vehicle 100. The rear camera 142a may include a fisheye lens that includes an ultra wide-angle lens that produces strong visual distortion intended to create a wide panoramic or hemispherical image. Fisheye cameras capture images having an extremely wide angle of view. Moreover, images 143 captured by the fisheye camera 142a have a convex non-rectilinear appearance. Other types of cameras 142 may also be used to capture the images 143 of the rear environment of the tow vehicle 100.

In some implementations, the sensor system 140 may also include the IMU (inertial measurement unit) 144 configured to measure the vehicle's linear acceleration (using one or more accelerometers) and rotational rate (using one or more gyroscopes). In some examples, the IMU 144 also determines a heading reference of the tow vehicle 100. Therefore, the IMU 144 determines the pitch, roll, and yaw of the tow vehicle 100.

The sensor system 140 may include other sensors such as, but not limited to, radar, sonar, LIDAR (Light Detection and Ranging, which can entail optical remote sensing that measures properties of scattered light to find range and/or other information of a distant target), LADAR (Laser Detection and Ranging), ultrasonic sensors, etc. Additional sensors may also be used.

The vehicle controller 150 executes a location estimation and path planning system 400 that receives images 143 from the camera 142 and IMU data 145 from the IMU 144 and determines a location LT of the trailer 200 with respect to the tow vehicle 100 based on the received images 143.

The controller 150 receives image data 143 from the rear camera 142a and IMU sensor data 145 from the IMU 144 and based on the received data 143, 145, the controller 150 estimates the camera pose 332 (i.e., camera location $L_C$ and angle $α_C$) and trailer pose 348 (i.e., trailer location $L_T$ and angle $α_T$) with respect to the world coordinate origin. The world coordinate origin is defined at the starting pose of the vehicle 100. The controller 150 includes a location estimation and path planning system 400 that includes a location estimation system 300. The location estimation system 300 fuses camera data 143 (e.g., monocular camera data) and IMU sensor data 145 to estimate the trailer pose 348, i.e., the trailer location $L_T$ and the trailer angle $α_T$ with respect to the world coordinate origin and a camera location $L_C$ and camera angle $α_C$ with respect to the world coordinate. The trailer angle $α_T$ being an angle between a fore-aft axis Y of the world coordinate and the centerline of the trailer 200. The camera angle $α_C$ being an angle between the fore-aft axis Y of the world coordinate and the optical axis of the camera. Once the location estimation system 300 determines the location $L_T$ of the trailer 200a and the angle $α_T$ of the trailer 200a with respect to the world coordinate and the camera location $L_C$ and camera angle $α_C$ with respect to the world coordinate, then the path planning system 400 determines a trajectory or path 500 to align the tow vehicle 100 with the trailer 200a.

Figure 3:
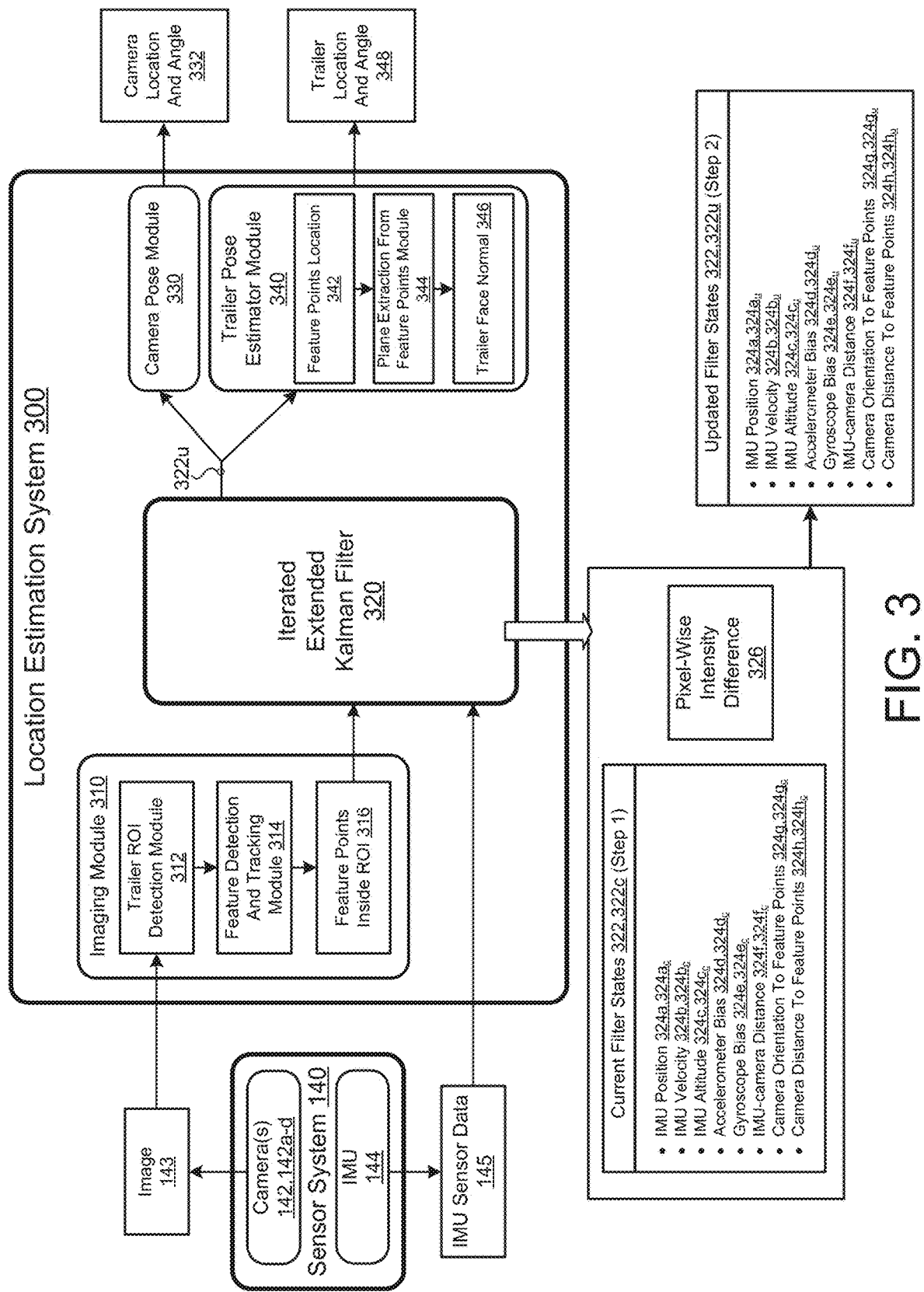
FIG. 3 is a schematic view of an exemplary location estimation system shown in FIG. 2.

The location estimation and path planning system 400 includes the location estimation system 300 and the path planning system 400. Referring to FIG. 3, the location estimation system 300 includes an imaging module 310 that includes a trailer ROI detection module 312 and a feature detection and tracking module 314 In addition, the location estimation system 300 includes the iterated Extended Kalman filter 320, a camera pose module 330, and a trailer pose estimator module 340.

The trailer ROI detection module 312 receives the image 143 from the rear camera 142a that includes the trailer representation 136. As previously mentioned, in some examples, the image 143 includes one or more trailer representations 136, 136a-c associated with one or more trailers 200, 200a-c positioned behind the tow vehicle 100. In some examples, when the image 143 includes more than one trailer representations 136, the location estimation and path planning system 400 instructs the display 132 to solicit a trailer selection 134 associated with a representation of one of the trailers 200. The driver selects the trailer 200a (i.e., a representation 136a of the trailer 200a) from the image 143. Once the trailer representation 136 is selected or identified, in some examples, the trailer ROI detection module 312 bounds the identified trailer representation 136 by a bounding box also referred to as a region of interest (ROI) 200, shown in FIG. 1B. In other examples, the trailer ROI detection module 312 instructs the display 132 to solicit the driver to select the trailer 200a (i.e., a representation 136a of the trailer 200a) by bounding the identified trailer representation 136a by the bounding box i.e., the ROI 230. The driver may enter the bounding box 200 via the user interface 130, for example, via the touch screen display 132, or a rotary knob or a mouse to select the bounding box 200 around the trailer representation 136 within the image 143.

Once the trailer ROI detection module 312 detects and identifies the ROI 230 that includes the trailer representation 136, then a feature detection and tracking module 314 identifies visual feature points 316 inside the ROI 230. The visual feature points 316 may be, for example, the trailer wheels, the coupler 212, the trailer edges, or any other feature associated with the trailer 200. Once the feature points 316 within the ROI 230 are detected, the feature detection and tracking module 314 tracks the detected features 316 while the tow vehicle 100 moves towards the trailer 200.

As previously mentioned, the location estimation system 300 includes an iterated extended Kalman filter 320 that receives the identified feature points 316 within the ROI 230 and the IMU sensor data 145 and analyzes the received data 145, 316. The iterative extended Kalman filter 320 fuses the identified feature points 316 and the IMU data 145. The iterative extended Kalman filter 320 uses a system's dynamic model, known control inputs to that system, and multiple sequential measurements (from sensors) to estimate the system's varying quantities.

An extended Kalman filter is a nonlinear version of the Kalman filter which linearizes about an estimate of the current mean and covariance. The Kalman filter is an algorithm that uses a series of measurements observed over time, and including statistical noise and other inaccuracies, and outputs estimates of unknown variables that are more accurate than those based on one measurement, because the Kalman filter 320 estimates a joint probability distribution over variables for each timeframe. The Kalman filter 320 executes its calculations in a two-step process. During the first step, also referred to as the prediction step, the Kalman filter 320 determines current states 322c (states 324, $324a_c$-$324j_c$), along with uncertainties associated with each current state variable 324a-j. When the outcome of the present measurement is observed, in the second step also known as the update step, these current states 314c (states 324, $324a_c$-$324j_c$) are updated using a weighted average, with more weight being given to the one with higher certainty (either current states 314c (states 324, $324a_c$-$324j_c$) or the present measurement). The algorithm is recursive, and runs in real time, using the present input measurements and the current filter states 322c (states 324, $324a_c$-$324j_c$) to determine updated filter states 322u (states 324, $324a_u$-$324j_u$), thus no additional past information is needed. An iterated extended Kalman filter 320 improves the linearization of the extended Kalman filter by reducing the linearization error at the cost of increased computational requirement.

The iterated extended Kalman filter 320 receives the IMU sensor data 145 from the IMU 144 and the visual feature points 316 within the ROI 230. In some implementations, the Iterated extended Kalman filter 320 determines filter states 322, 322c, 322u that update continuously based on the received IMU sensor data 145 and the visual feature points 316. The filter states 322, 322c, 322u may include calibrated values such as a distance 324f between the IMU 144 and the rear camera 142a since the position of both within the tow vehicle 100 is known. In some examples, the filter states 322, 322c, 322u include an IMU position state 324a, an IMU velocity state 324b, and an IMU altitude state 324c that are determined by the iterated extended Kalman filter 320 based on IMU sensor data 145 (that includes the acceleration and the angular velocity data of the tow vehicle 100), the calibrated distance 324f between the IMU 144 and the rear camera 142a, and the position of the camera 142a in a coordinate system, for example a world coordinate system. The world coordinate system defines the world origin (a point whose coordinates are [0,0,0]) and defines three-unit axes orthogonal to each other. The coordinate of any point in the world space are defined with respect to the world origin. Once the world coordinate system is defined, the position of the camera 142a may be defined by a position in the world space and the orientation of camera 142a may be defined by three-unit vectors orthogonal to each other. In some examples, the world origin is defined by the initial position of the camera, and the three-unit axes are defined by the initial camera orientation. The position of the camera 142a is determined or known by the camera pose module 330 as will be described below. As previously mentioned, the IMU 144 includes an accelerometer for determining the linear acceleration of the tow vehicle and a gyroscope for determining the rotational rate of the vehicle wheels. In addition, in some examples, the filter states 322, 322c, 322u include an Accelerometer bias state 324d and a Gyroscope bias state 324e. The inertial sensors such as the accelerometer and gyroscope often include small offset in the average signal output, even when there is no movement. The Accelerometer bias state 324d estimates the small offset of the accelerometer sensor in the average signal output, and the Gyroscope bias state 324e estimates the small offset of the gyroscope sensor in the average signal output.

In some examples, the filter states 322, 322c, 322u include a camera orientation to the ROI feature points state 324g being the orientation of the camera 142a to the one or more ROI feature points 316 identified by the feature detection and tracking module 314. The filter states 324 may also include a camera distance to ROI feature points state 324h being the distance between the camera 142a and the one or more ROI feature points 316 identified by the feature detection and tracking module 314.

The iterated extended Kalman filter 320 generates a pixel-wise intensity difference 326 between the visual feature points 316 of a current image 143 and a previously tracked image 143. The extended iterated Kalman filter 320 determines the pixel-wise intensity difference 326 by running a routine on a pixel location of the current image 143 and the previously tracked image 143 and returns a result, then moves to the next pixel location and repeats the same routine, until all pixels of the current image 143 and the previously tracked image 143 are processed and the pixel-wise intensity difference 326 is determined.

In a first step, the iterated extended Kalman filter 320 predicts current filter states 322c, $324a_c$-$324j_c$ based on the received IMU sensor data 145 (i.e., acceleration and angular velocity data). In a second step, the iterated extended Kalman filter 320 updates the values of the current states $324a_c$-$324i_c$ based on the pixel-wise intensity difference 326 between the tracked feature points 316 of a current image 143 and the previous corresponding feature points 316 of a previously tracked image 143 to update and correct the updated filter states 322u, $324a_u$-$324i_u$. Therefore, the current state $324a_c$-$324i_c$ of each of the mentioned state 322c is updated every time the iterated extended Kalman filter 320 receives data from the IMU 144 and the rear camera 142a.

The location estimation system 300 also includes a camera pose module 330 that calculates a location $L_C$ and orientation or an angle $\alpha_C$ of the camera 142a in the world coordinate system based on the updated filter states 322u. For example, the camera pose module 330 calculates a camera location $L_C$ and a camera angle $\alpha_C$ as shown in FIG. 1C, the camera angle $\alpha_C$ being an angle at the world coordinate origin between the fore-aft axis Y of the world coordinate and the position of the camera.

The trailer pose estimator module 340 calculates the location 342 of the feature points 316 in the world coordinate system based on the updated filter states 322u. Then the trailer pose estimator module 340, for example a plane extraction module 344, determines a plane P based on the feature points location 342. The plane P is the front face of the trailer 200 as shown in FIGS. 1A. Once the plane P is identified, then the trailer pose estimator module 340 calculates a normal line 346 to the plane P to identify the trailer angle $\alpha_T$ with respect to the world coordinate system.

As previously discussed, the location estimation system 300 leverages the iterative extended Kalman filter 320 to fuse camera image data 143 and IMU sensor data 145 to estimate and determine the trailer location $L_T$ and the trailer angle $\alpha_T$ in the world coordinate system, and the camera location $L_C$ and camera angle $\alpha_C$ in the world coordinate system. The location estimation system 300 provides high accuracy by using tightly coupled fusion techniques and increases robustness by leveraging feature detection and tracking module 314 for updating current filter states 322c in the iterated extended Kalman filter 320. As described above, the location estimation system 300 utilizes low computational resource and achieves real time performance using low cost hardware. Moreover, the location estimation system 300 increases the robustness of the determination of the trailer location due to reliance on the analysis of the images 143 by the feature detection and tracking module 314 for the filter state updates 322u.

Figure 4:
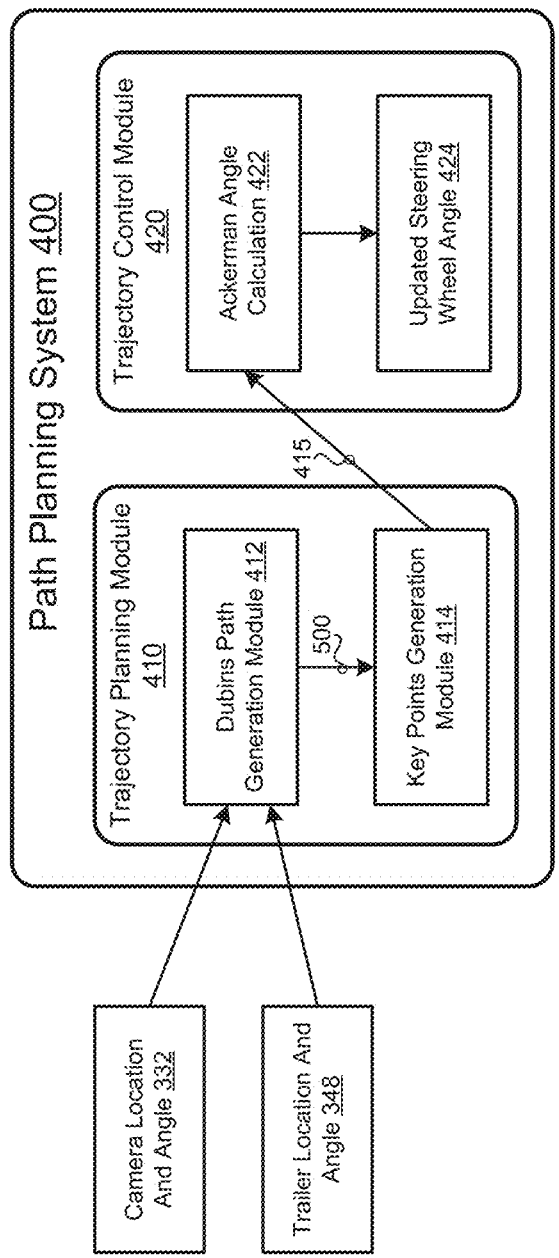

Referring to FIG. 4, the path planning system 400 includes a trajectory planning module 410 and a trajectory control module 420. The trajectory planning module 410 receives the pose 332 (i.e., camera location $L_C$ and camera angle $\alpha_C$) from the camera pose module 330 and the trailer pose 348 i.e., trailer location LT and trailer angle $\alpha_T$) from the trailer pose estimator module 340. The trajectory planning module 410 includes a Dubins path generation module 412 and a key points generation module 414. The Dubins path generation module 412 receives the camera pose 332 and the trailer pose 348 and generates a Dubins path 500. Dubins path refers to the shortest curve that connects two points in the two-dimensional Euclidean plane (i.e., x-y plane) with a constraint on the curvature of the path and with prescribed initial and terminal tangents to the path, and an assumption that the vehicle traveling the path can only travel in one direction. Dubins path 500 is generated by joining circular arcs of maximum curvature and straight lines. FIGS. 5A-5C illustrate the Dubins path. FIG. 5A shows a CLC, circle line circle configuration, used when the distance between the tow vehicle 100 and the trailer 200 is at a specific threshold, not the direction of the trailer 200 with respect to the tow vehicle 100. FIG. 5B shows a CL, circle line configuration, used when the distance between the tow vehicle 100 and the trailer 200 is at a minimum and only one turn is needed to align the tow vehicle 100 and the trailer 200. FIG. 5C shows another CLC configuration, used when the tow vehicle 100 is aligned with the trailer 200, but with a lateral distance. Once Dubins Path generation module 412 generates a path 500, then key points generations module 414 identifies a sequence of points 415 along the path 500 for the tow vehicle 100 to follow.

Following, a trajectory control module 420 determines the steering wheel angle of the tow vehicle 100 in a rearward direction R to follow the path 500. In addition, the trajectory control module 420 executes an Ackermann angle calculation 422 based on the received sequence of points 415 from the key point generation module 414. Ackermann steering geometry is a geometric arrangement of linkages in the steering of the tow vehicle 100 that solves the problem of wheels 112 on the inside and outside of a turn needing to trace out circles of different radii. Therefore, Ackermann angle calculation 422 assumes that all the wheels 112 have their axles arranged as radii of circles with a common center point. As the rear wheels are fixed, this center point must be on a line extended from the rear axle. Intersecting the axes of the front wheels on this line as well requires that the inside front wheel be turned, when steering, through a greater angle than the outside wheel. Therefore, Ackermann angle calculation 422 determines difference between the steering angle of each front wheel. The trajectory control module 420 updates the steering wheel angles based on the Ackermann angle calculation 422 and determines an updated steering wheel angle 424 for each one of the front wheels 112a, 112b to follow the path 500.

As the tow vehicle 100 is autonomously maneuvering along the planned path 500, the path planning system 400 continuously updates the path based on continuously receiving sensor data. In some examples, an object detection system identifies one or more objects along the planned path and sends the path planning system 400 data relating to the position of the one or more objects. In this case, the path planning system 400 recalculates the planned path 500 to avoid the one or more objects while also executing the predetermined maneuvers. In some examples, the path planning system determines a probability of collision and if the probability of collision exceeds a predetermined threshold, the path planning system 400 adjusts the path 500 and sends it to the drive assist system 180.

Once the path planning system 400 determines the planned path 500, then the vehicle controller 150 executes the drive assist system 180, which in turn includes path following behaviors 182. The path following behaviors 182 receive the planned path and executes one or more behaviors 182a-b that send commands 184 to the drive system 110, causing the tow vehicle 100 to autonomously drive along the planned path, which causes the tow vehicle 100 to autonomously drive along the planned path.

The path following behaviors 182a-b may include one or more behaviors, such as, but not limited to, a braking behavior 182a, a speed behavior 182b, and a steering behavior 182c. Each behavior 182a-b causes the tow vehicle 100 to take an action, such as driving backward, turning at a specific angle, breaking, speeding, slowing down, among others. The vehicle controller 150 may maneuver the tow vehicle 100 in any direction across the road surface by controlling the drive system 110, more specifically by issuing commands 184 to the drive system 110.

The braking behavior 182a may be executed to either stop the tow vehicle 100 or to slow down the tow vehicle 100 based on the planned path. The braking behavior 182a sends a signal or command 184 to the drive system 110, e.g., the brake system (not shown), to either stop the tow vehicle 100 or reduce the speed of the tow vehicle 100.

The speed behavior 182b may be executed to change the speed of the tow vehicle 100 by either accelerating or decelerating based on the planned path. The speed behavior 182b sends a signal or command 184 to the brake system 114 for decelerating or the acceleration system 116 for accelerating.

The steering behavior 182c may be executed to change the direction of the tow vehicle 100 based on the planned path. As such, the steering behavior 182c sends the acceleration system 116 a signal or command 184 indicative of an angle of steering causing the drive system 110 to change direction.

As previously discussed, the location estimation and path planning system 400 provides the location of a selected trailer 200 in the world coordinate system without the use of one or more markers positioned on the trailer 200. Moreover, the location estimation and path planning system 400 provides high accuracy by using tightly coupled fusion techniques, which require low computational resources, and which can achieve real time performance on low cost hardware. Since no marker is needed on the trailer 200, the complexity of the operation and computations is reduced and thus the production cost of the system is also reduced.

Figure 6:
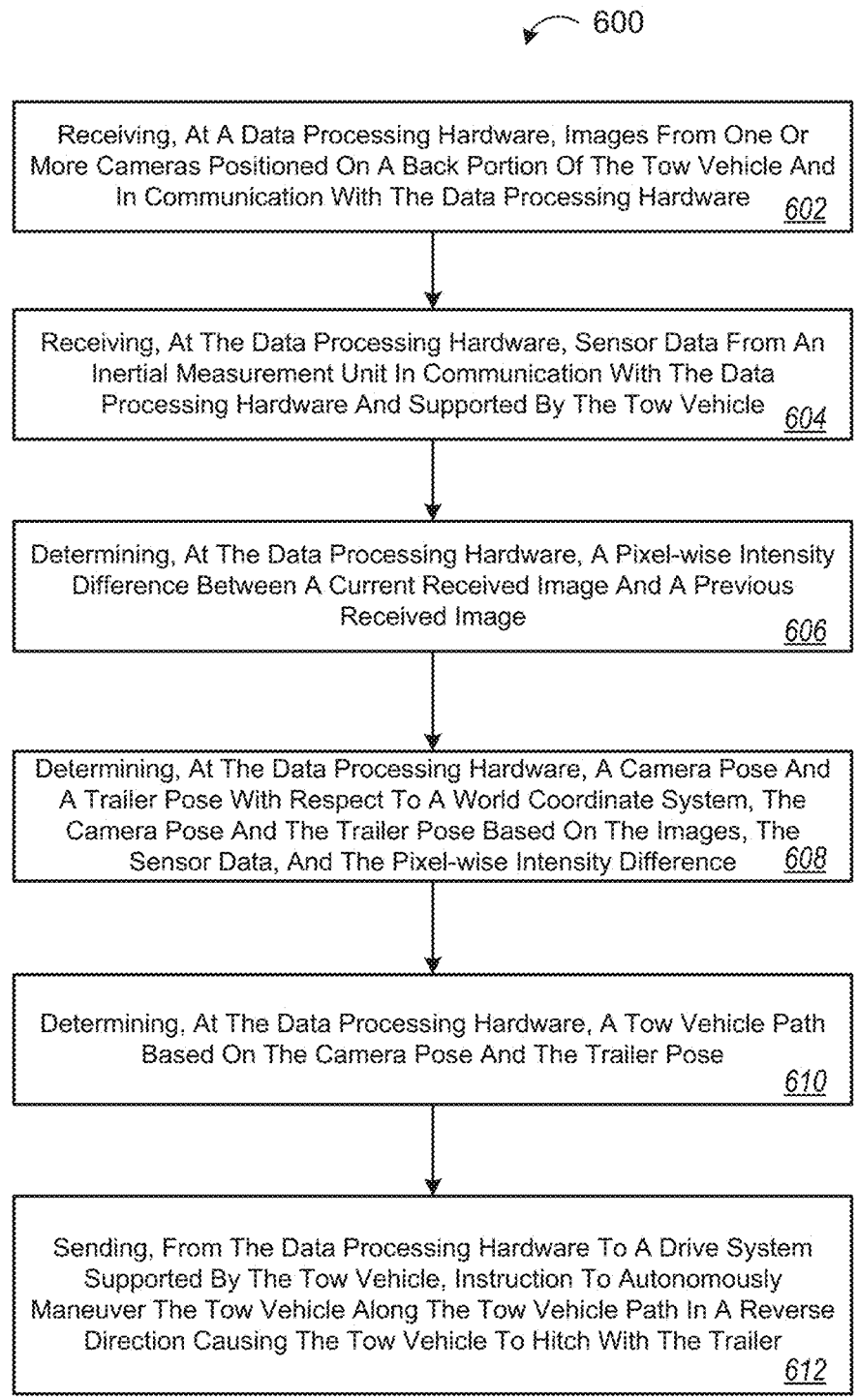
FIG. 6 is a schematic view of an exemplary arrangement of operations for autonomously maneuvering a tow vehicle towards a trailer.

FIG. 6 provides an example arrangement of operations for a method 600 of autonomously maneuvering a tow vehicle 100 towards a trailer 200 for autonomous hitching between the trailer 200 and the tow vehicle 100 using the system described in FIGS. 1-5. At block 602, the method 600 includes receiving, at a data processing hardware 152, images from one or more cameras 142a positioned on a back portion of the tow vehicle 100 and in communication with the data processing hardware 152. The camera may include a fisheye lens that includes an ultra wide-angle lens. At block 604, the method 600 includes receiving, at the data processing hardware 152, sensor data 145 from an inertial measurement unit 144 in communication with the data processing hardware 152 and supported by the tow vehicle 100. At block 606, the method 600 includes determining, at the data processing hardware 152, a pixel-wise intensity difference 326 between a current received image 143 and a previous received image 143. At block 608, the method 600 includes determining, at the data processing hardware 152, a camera pose 332 and a trailer pose 348 both with respect to a world coordinate system. The camera pose 332 and the trailer pose 348 are based on the images 143, the sensor data 145, and the pixel-wise intensity difference 326. At block 610, the method 600 includes determining, at the data processing hardware 152, a tow vehicle path 500 based on the camera pose 332 and the trailer pose 348. At block 612, the method 600 includes sending instruction 184 from the data processing hardware 152 to a drive system 110 supported by the tow vehicle 100. The instructions 184 causing the tow vehicle 100 to autonomously maneuver along the tow vehicle path 500 in a reverse direction R so that the tow vehicle 100 hitches with the trailer 200.

In some example, the camera pose includes a camera location $L_C$ and a camera angle $\alpha_C$ in the world coordinate system. The trailer pose may include a trailer location $L_C$ and a trailer angle $\alpha_T$ in the world coordinate system. The method 600 may include identifying one or more feature points within the images, the feature points 316 associated with the trailer 200. The method 600 may also include determining a plane P based on the one or more feature points 316. The plane P is indicative of a front face of the trailer 200. The method may include determining a normal line to the plane P and determining the trailer angle $\alpha_T$ based on the normal line.

In some examples, the method includes determining a region of interest 230 surrounding a representation 136 of the trailer 200 within the images 143. Determining a pixel-wise intensity difference 326 between the current received image 143 and a previous received image 143, includes determining the pixel-wise intensity difference 326 between the region of interest 230 of the current received image 143 and the region of interest 230 of the previous received image 143. The method 600 may further include identifying one or more feature points 316 within the region of interest 230. The feature points 316 are associated with the trailer 200. The method 600 may also include tracking the one or more feature points 316 as the vehicle 100 autonomously maneuvers along the path 500.

In some implementations, the method 600 includes determining a sequence of points associated with the path 500. The tow vehicle 100 follows the sequence of points along the path 500. The method 600 also includes determining a steering wheel angle associated with each point within the sequence of points and sending instructions to the drive system 110 to adjust a current steering wheel angle based on the determined steering wheel angle.

The method 600 may also include determining a difference between a steering angle of each front wheel 112 of the tow vehicle 100, as the vehicle 100 autonomously maneuver along the path 500. The method 600 may also include sending instructions 184 to the drive system 110 to adjust the steering wheel angle of each wheel 112 based on the difference between the steering wheel angle of each front wheel 112.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method for autonomously maneuvering a tow vehicle towards a trailer for autonomous hitching between the trailer and the tow vehicle, the method comprising:
   receiving, at a data processing hardware, images from one or more cameras positioned on a back portion of the tow vehicle and in communication with the data processing hardware;
   receiving, at the data processing hardware, sensor data from an inertial measurement unit in communication with the data processing hardware and supported by the tow vehicle;
   determining, at the data processing hardware, a pixel-wise intensity difference between a current received image and a previous received image;
   determining, at the data processing hardware, a camera pose and a trailer pose with respect to a world coordinate system, the camera pose and the trailer pose based on the images, the sensor data, and the pixel-wise intensity difference;
   determining, at the data processing hardware, a tow vehicle path based on the camera pose and the trailer pose;
   sending, from the data processing hardware to a drive system supported by the tow vehicle, instruction to autonomously maneuver the tow vehicle along the tow vehicle path in a reverse direction causing the tow vehicle to hitch with the trailer;
   wherein the camera pose includes a camera location and a camera angle in the world coordinate system and the trailer pose includes a trailer location and a trailer angle in the world coordinate system;
   identifying one or more feature points within the images, the feature points associated with the trailer;
   determining a plane based on the one or more feature points, the plane being indicative of and corresponding to a front face of the trailer at a distance from a trailer coupler of the trailer;
   determining a normal line to the plane; and
   determining the trailer angle based on the normal line.

2. The method of claim 1, wherein the one or more cameras include a fisheye lens that includes an ultra wide-angle lens.

3. The method of claim 1, further comprising:
   determining a region of interest surrounding a representation of the trailer within the images,
   wherein determining a pixel-wise intensity difference between the current received image and a previous received image, includes determining the pixel-wise intensity difference between the region of interest of the current received image and the region of interest of the previous received image.

4. The method of claim 3, further comprising:
   tracking the one or more feature points as the vehicle autonomously maneuvers along the path.

5. The method of claim 1, further comprising:
   determining a sequence of points associated with the path, wherein the tow vehicle follows the sequence of points;
   determining a steering wheel angle associated with each point within the sequence of points; and
   sending instructions to the drive system to adjust a current steering wheel angle based on the determined steering wheel angle.

6. The method of claim 1, further comprising:
   determining a difference between a steering angle of each front wheel of the tow vehicle, as the vehicle autonomously maneuver along the path; and
   sending instructions to the drive system to adjust the steering wheel angle of each wheel based on the difference between the steering wheel angle of each front wheel.

7. The method of claim 1, wherein determining the tow vehicle path comprises a joining of a plurality of circular arcs of maximum curvature and one or more line segments.

8. A system for autonomously maneuvering a tow vehicle towards a trailer for autonomous hitching between the trailer and the tow vehicle, the system comprising:
   data processing hardware; and
   memory hardware in communication with the data processing hardware, the memory hardware storing instructions that when executed on the data processing hardware cause the data processing hardware to perform operations comprising:
      receiving images from one or more cameras positioned on a back portion of the tow vehicle and in communication with the data processing hardware;
      receiving sensor data from an inertial measurement unit in communication with the data processing hardware and supported by the tow vehicle;
      determining a pixel-wise intensity difference between a current received image and a previous received image;
      determining a camera pose and a trailer pose with respect to a world coordinate system, the camera pose and the trailer pose based on the images, the sensor data, and the pixel-wise intensity difference;
      determining a tow vehicle path based on the camera pose and the trailer pose;
      sending instruction to a drive system supported by the tow vehicle, the instructions causing the tow vehicle to autonomously maneuver along the tow vehicle path in a reverse direction causing the tow vehicle to hitch with the trailer;
      determining a difference between a steering angle of each front wheel of the tow vehicle, as the vehicle autonomously maneuver along the path; and
      sending instructions to the drive system to adjust the steering wheel angle of each wheel based on the difference between the steering wheel angle of each front wheel.

9. The system of claim 8, wherein the one or more cameras include a fisheye lens that includes an ultra wide-angle lens.

10. The system of claim 8, wherein:
    the camera pose includes a camera location and a camera angle in the world coordinate system; and
    the trailer pose includes a trailer location and a trailer angle in the world coordinate system.

11. The system of claim 10, wherein the operations further include:
    identifying one or more feature points within the images, the feature points associated with the trailer;
    determining a plane based on the one or more feature points, the plane indicative of and corresponding to a front face of the trailer that is at a distance from a trailer coupler of the trailer;
    determining a normal line to the plane; and
    determining the trailer angle based on the normal line.

12. The system of claim 8, wherein the operations further include:

determining a region of interest surrounding a representation of the trailer within the images, wherein determining a pixel-wise intensity difference between the current received image and a previous received image, includes determining the pixel-wise intensity difference between the region of interest of the current received image and the region of interest of the previous received image.

13. The system of claim 12, wherein the operations further include:

identifying one or more feature points within the region of interest, the feature points associated with the trailer;

tracking the one or more feature points as the vehicle autonomously maneuvers along the path.

14. The system of claim 8, wherein the operations further include:

determining a sequence of points associated with the path, wherein the tow vehicle follows the sequence of points;

determining a steering wheel angle associated with each point within the sequence of points; and sending instructions to the drive system to adjust a current steering wheel angle based on the determined steering wheel angle.

\* \* \* \* \*